United States Patent [19]
Wilcox et al.

[11] Patent Number: 5,659,662
[45] Date of Patent: Aug. 19, 1997

[54] UNSUPERVISED SPEAKER CLUSTERING FOR AUTOMATIC SPEAKER INDEXING OF RECORDED AUDIO DATA

[75] Inventors: Lynn D. Wilcox, Portola Valley; Donald G. Kimber, Mt. View, both of Calif.

[73] Assignee: Xerox Corporation, Stamford, Conn.

[21] Appl. No.: 710,013

[22] Filed: Sep. 9, 1996

Related U.S. Application Data

[63] Continuation of Ser. No. 226,525, Apr. 12, 1994, abandoned.

[51] Int. Cl.⁶ .................................................. G10L 9/00
[52] U.S. Cl. ..................... 395/2.54; 395/2.52; 395/2.53; 395/2.64
[58] Field of Search .............................. 395/2.52, 2.53, 395/2.54, 2.56, 2.4, 2.59

[56] References Cited

U.S. PATENT DOCUMENTS 4,802,224  1/1989  Shiraki et al. .......................... 381/41

OTHER PUBLICATIONS

Levinson et al, "Interactive Clustering Techniques for Selecting Speaker–Independent Ref Templates for Isolated Word Recognition," IEEE Trans. Acoustics, Speech and Signal Processing, Apr. 1979, vol. ASSP–27, No. 2, pp. 134–141.

Parsons, *Voice and Speech Processing*, McGraw Hill Book Co, 1986, pp. 188–191.

Rabiner et al, "HMM Clustering for connected word recognition", 1989, ICASSP–89, vol. 1, pp. 405–408.

Gish et al., "Segregation of Speakers for Speech Recognition and Speaker Identification," Proc. Int. Conf. Acoustics, Speech and Signal Processing, May 1991, vol. 2 pp. 873–876.

Siu et al., "An Unsupervised Sequential Learning Algorithm for the Segmentation of Speech Waveforms with Multiple Speakers," Proc. Int. Conf. Acoustics, Speech and Signal Processing, Mar. 1992, vol. 2 pp. 189–192.

Sugiyama et al., "Speech Segmentation and Clustering Based on Speaker Features," Proc. Int. Conf. Acoustics, Speech and Signal Processing, Apr. 1993, vol. 2, pp. 395–398.

Matsui et al., "Comparison of Text–Independent Speaker Recognition Methods Using VQ–Distortion and Discrete/Continuous HMMs," Proc. Int. Conf. Acoustics, Speech and Signal Processing, Mar. 1992, vol. 2, pp. 157–160.

*Primary Examiner*—Allen R. MacDonald
*Assistant Examiner*—Vijay B. Chawan
*Attorney, Agent, or Firm*—R. Christine Jacobs; Tracy L. Hurt

[57] ABSTRACT

A system and method for unsupervised clustering of audio data segments in an audio data recording containing speech from multiple speakers including the steps of: 1) providing a portion of the audio data containing speech from all of the speakers; 2) forming initial clusters by dividing the portion of the audio data into segments, each of which includes an ordered data set; 3) computing the pairwise distance between each pair of clusters using a likelihood ration independent of the order of data within the segments; and 4) combining into a new cluster the two clusters with a minimum pairwise distance. These steps are repeated until a number of clusters equal to the number of speakers is obtained.

14 Claims, 8 Drawing Sheets

UNSUPERVISED SPEAKER CLUSTERING FOR AUTOMATIC SPEAKER INDEXING OF RECORDED AUDIO DATA

This is a continuation of application Ser. No. 08/226,525, filed Apr. 12, 1994, now abandoned.

CROSS REFERENCE TO RELATED APPLICATIONS

The present invention is directly related to an invention that is the subject matter of concurrently filed, commonly assigned U.S. patent applications having the following serial number and title:

Ser. No. 08/226,519, Attorney Docket No. D/94123, "SEGMENTATION OF AUDIO DATA FOR INDEXING OF CONVERSATIONAL SPEECH FOR REAL-TIME OR POSTPROCESSING APPLICATIONS," and is herein incorporated by reference.

Ser. No. 08/226,580, Attorney Docket No. D/94123Q, "REAL-TIME AUDIO RECORDING SYSTEM FOR AUTOMATIC SPEAKER INDEXING," and is herein incorporated by reference.

Ser. No. 08/226,523, Attorney Docket No. D/94186Q, "IMPROVED METHOD OF SPEAKER CLUSTERING FOR UNKNOWN SPEAKERS IN CONVERSATIONAL AUDIO DATA," and is herein incorporated by reference.

FIELD OF THE INVENTION

The present invention relates to improved techniques for initial clustering of unknown speakers in recorded conversational data.

More specifically, the present invention relates to a technique for recomputing distances in likelihood computations in clustering unknown speakers in recorded audio data.

BACKGROUND OF THE INVENTION

Audio and video recordings have become commonplace with the advent of consumer grade recording equipment. It is no longer rare to find a business meeting, a lecture, or a birthday party being recorded as a historical record for later reviewing. Unfortunately, both the audio and video mediums provide few external or audio clues to assist in accessing the desired section of the recording. In books, indexing is provided by the table of contents at the front and the index at the end, which readers can browse to locate authors and references to authors. A similar indexing scheme would be useful in an audio stream, so that users could locate sections where specific speakers were talking. The limited amount of data associated with most video recordings does not provide enough information for the viewer to confidently and easily access desired points of interest. Instead they must peruse the contents of a recording in sequence to retrieve desired information.

Retrieval can be aided by notes taken during the recording, for example notes which indicate the speaker and the topic. While this provides a structural outline, the lack of direct correlation between the video medium and the notation medium forces interpolation of the time stamps on the video with the content of the notes. This is complicated by the fact that notes for events in non-correlated media do not usually include the events' durations. In addition, such notetaking or indexing is quite burdensome. Computer systems may be used for notetaking during events, which may be recorded simultaneously, or pre-recorded. Text-based systems using keyboards may be used in these instances, but since most people talk much faster than they type, creating computer generated textual labels to describe the content in real time requires enormous effort.

Alternatively, the method of the present invention enables retrieval based on indexing an audio stream of a recording according to the speaker. In particular, an audio stream may be segmented into speaker events, and each segment labeled with the type of event, or speaker identity. When speech from individuals is intermixed, for example in conversational situations, the audio stream may be segregated into events according to speaker difference, with segments created by the same speaker identified or marked.

Speaker change markers showing different speakers in the audio stream may allow random access to otherwise sequential data. In a real-time setting, such audio segmenting may aid in creating a usable index into a recording as it is being made. Each segment represents an utterance by a single individual. Utterances by the same speaker are combined and similarly referenced to form an index. Identification of pauses, or silence intervals, in conversational speech is also important in audio indexing.

Creating an index into an audio stream, either in real time or in postprocessing, may enable a user to locate particular segments of the audio data. For example, this may enable a user to browse a recording to select audio segments corresponding to a specific speaker, or "fast-forward" through a recording to the next speaker. In addition, knowing the ordering of speakers can also provide content clues about the conversation, or about the context of the conversation.

Gish et al., "Segregation of Speakers for Speech Recognition and Speaker Identification," Proc. Int. Conf. Acoustics, Speech and Signal Processing, May 1991, vol. 2 pp. 873–876 describe a method for segmenting speech using hierarchical clustering. A dendrogram is constructed based on iteratively merging the pair of segments with smallest distance. The distance between segments is based on the likelihood ratio of two segments being from the same speaker vs. the two segments being from different speakers. The application described involves separating speech from an air traffic controller and various pilots, by identifying the largest cluster in the dendrogram with the controller, and all others with the pilots. They do not discuss methods for separating the pilots, although cuts through the dendrogram might be used.

While this technique could be used for non-real-time speaker segmentation, the method of the present invention offers several improvements. First, the likelihood ratio used by Gish et al. is based on a single Gaussian, while the present method uses tied Gaussian mixtures, which we have shown improves performance. Second, the hierarchical clustering algorithm of the present method recomputes pairwise distances, thus providing effectively longer segments for the distance measure, which is known to improve accuracy. Third, hidden Markov modeling is applied in the present method so that the time resolution of the segmentation is on the order of 20 ms rather than on the several second segments used in the hierarchical clustering. Finally, the present method proposes a resegmentation algorithm which iteratively improves the Hidden Markov Model (HMM)-based segmentation.

Siu et al., "An Unsupervised Sequential Learning Algorithm for the Segmentation of Speech Waveforms with Multiple Speakers," Proc. Int. Conf. Acoustics, Speech and Signal Processing, March 1992, vol. 2 pp. 189–192, describe a method for separating several air traffic controllers from pilots. Silence segments are identified first, and initial speech segments are identified as those regions between silence. These segments are grouped into regions containing 50 speech segments, and the assumption is made that in these regions there is a single air traffic controller. Hierarchical clustering is then performed as in Gish et. al., resulting in a cluster for the controller and a cluster for all the pilots. This data is used to initialize a Gaussian mixture model for the controller and the pilots. An Expectation-Maximization (EM) algorithm is then used to iteratively classify the segments as controller or pilot, and re-estimate the mixture models. After convergence, a dynamic programming algorithm is used to improve classification by taking into account speaker duration.

The method of the present invention offers several improvements over Siu et al. As noted above, hierarchical clustering using tied Gaussian mixtures gives better results, as does recomputing the distances. Second, the present use of hidden Markov modeling allows the durational constraints to be accounted for during classification, as opposed to using dynamic programming as a post-processor. Third, the present technique of using tied silence models allows silences to be determined during classification stage, rather than as a pre-processor.

Sugiyama et al., "Speech Segmentation and Clustering Based on Speaker Features," Proc. Int. Conf. Acoustics, Speech and Signal Processing, April 1993, vol. 2, pp. 395–398, discuss a method for segmenting speech when the speakers are unknown, but the number of speakers is known. Their speaker models consist of a single state HMM. Iterative resegmentation is performed, where the speaker models are retrained and the segmentation re-estimated. However, their method has several drawbacks. First, their speaker models are initialized randomly, a technique which is known to produce variable results. Our method describes robust initialization of speaker models. Second, silence is not estimated. And third, the single state speaker HMMs are not as robust as multistate HMMs.

Matsui et. al., "Comparison of Text-Independent Speaker Recognition Methods Using VQ-Distortion and Discrete/Continuous HMMs," Proc. Int. Conf. Acoustics, Speech and Signal Processing, March 1992, vol. 2, pp. 157–160 compare speaker identification methods using HMM speaker models and vector quantization (VQ). However, they do not teach segmentation of speech from multiple speakers.

In the present invention, Hidden Markov Models (HMMs) are used to model individual speakers. Speaker models consist of multiple state HMMs with Gaussian output distributions, and a tied silence model. Such HMMs may be initially trained using Baum-Welch procedures when speakers are known and training data is available. Alternatively, individual HMMs may be initialized by first performing agglomerative hierarchical cluster techniques using likelihood distances for an initial segmentation of the speech waveform, and using the initial segmentation to train individual speaker HMMs. The speaker HMMs can then be iteratively retrained as described below.

Networks of HMMs are created to model conversational speech including numerous speakers. Using the HMM network, the audio stream is segmented based on the most likely sequence of states through the network. This segmentation may be done in real-time, the segment information being correlated to and stored in conjunction with the audio stream even as it is being created and recorded. In post-recording operation, subsequent retraining of the models and resegmenting of the audio stream may be performed, iterations continuing while changes in segmentation occur from improved models.

When the segmentation is completed, the audio stream is accompanied by an audio index, segregating the audio stream into utterances according to individuals. Non-speech sounds, such as ringing telephones, may also be detected and segmented.

It is an object of the present invention to provide an improved method of performing unsupervised estimation of initial segmentation of an audio stream containing multiple speakers.

SUMMARY OF THE INVENTION

The present invention discloses a method for unsupervised clustering of audio data segments in an audio recording containing speech from multiple speakers to segment the audio data comprising steps of 1) providing a portion of the audio data containing speech from all of the speakers; 2) forming initial clusters by dividing the portion of the audio data into segments, each of which includes an ordered data set; 3) computing the pairwise distance between each pair of clusters using a likelihood ration independent of the order of data within the segments; and 4) combining into a new cluster the two clusters with a minimum pairwise distance. The iterations are performed until clusters for a desired number of speakers is obtained.

The clusters so obtained may be used to train individual HMM speaker models. These speaker models may then be combined in parallel to form a speaker network HMM, which may be used to determine segmentation of the audio data according to speaker by finding an optimal path through the speaker network.

Also disclosed is a processor controlled system for correlating an electronic index according to speaker for recorded audio data. The system includes an audio source for providing speech from a plurality of individual speakers, which is processed by an audio processor into spectral feature data. A system processor receives the spectral feature data from the audio processor and produces estimated speaker models based on a likelihood ratio that segments of the data were generated by the same speaker, which may be combined in parallel to form a speaker network. The speaker network is used by the system processor to determine segments of the audio data which correspond to different individual speaker models.

The system processor may collect audio data segments with correspond to the same speaker to retrain the speaker models. A new speaker network is determined by the system processor to resegment the audio data.

The following description, the drawings and the claims further set forth these and other objects, features and advantages of the invention.

DETAILED DESCRIPTION

A. System Overview

Figure 1:
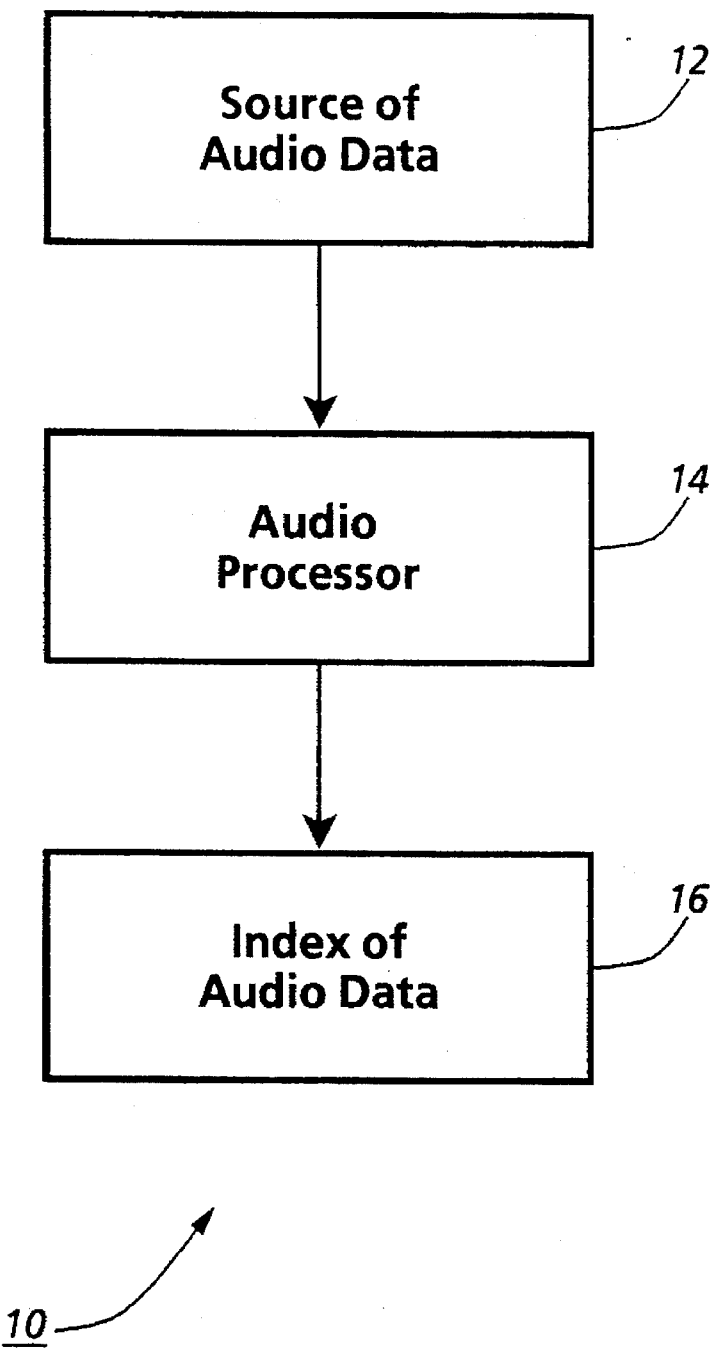
FIG. 1 is a block diagram of a generalized audio processing system within which the present invention may be embodied.

FIG. 1 is a block diagram of a generalized audio processing system 10, within which the present invention may be embodied. Generally, an audio stream is provided from a source of audio data 12, which may be provided by conversational speakers, a recorded video with accompanying audio track, or other audio source. The audio data is sent to an audio processor 14, which may be any well-known device such as a general purpose computer, configured according to the present invention. The audio processor outputs an index of the audio data 16.

Figure 2:
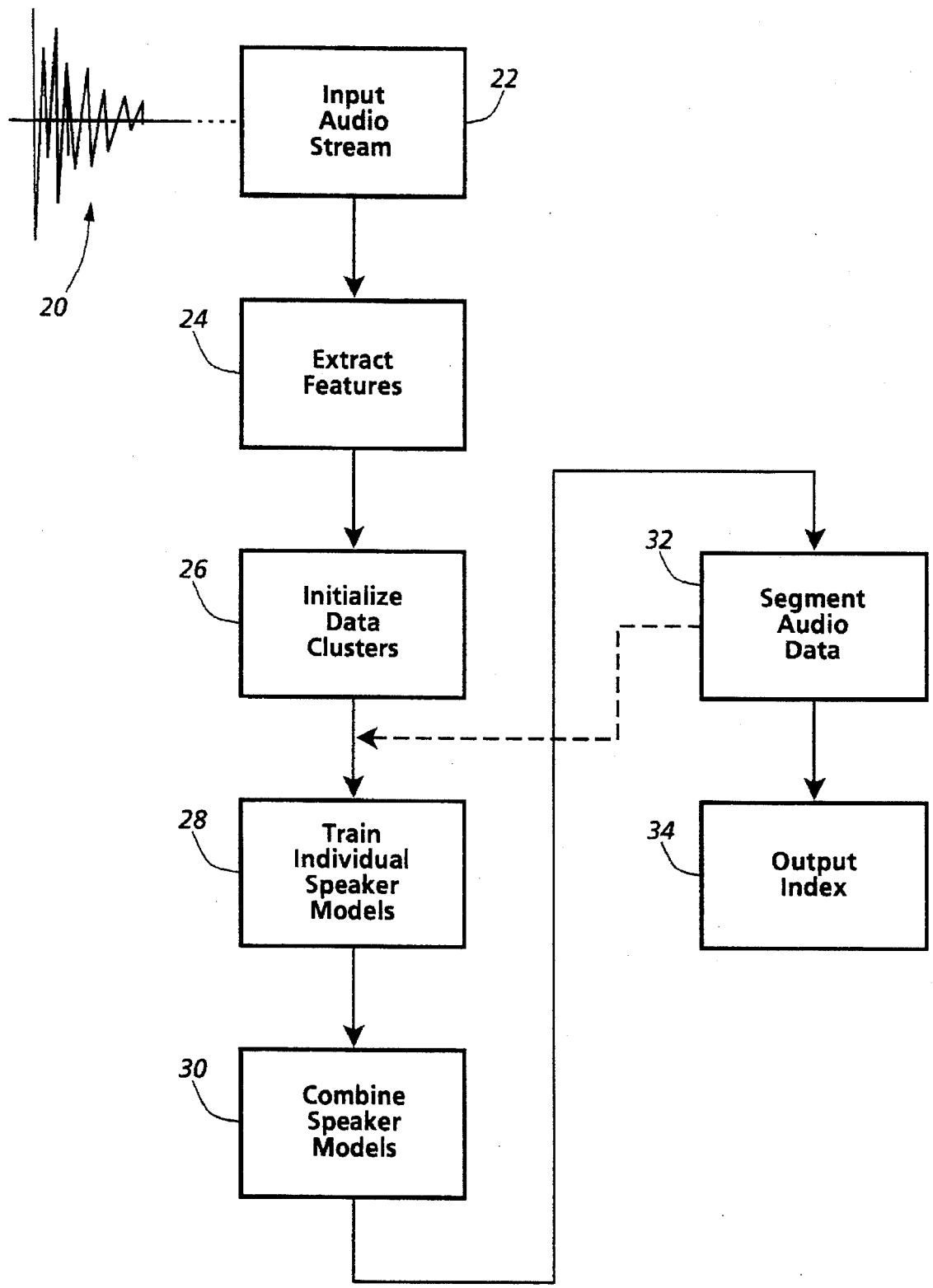
FIG. 2 is a generalized flow diagram of an audio indexing system.

FIG. 2 is a generalized flow diagram of an audio indexing system. The steps shown in FIG. 2 will be discussed in more detail below, but FIG. 2 serves to give an overview of the method described by the invention.

An audio waveform 20 is input in the step in box 22. The audio stream in box 22 may contain a portion of the audio that is to be processed, but must contain speech from all the speakers in the audio stream. For the purpose of this discussion, the entire audio stream is input in the step in box 22. The step in box 24 converts the speech signal data into spectral feature vectors. For example, a 12th order cepstrum may be computed every 20 ms.

The initialization of audio data clusters takes place in the step in box 26, which includes clustering the data into initial partitions using agglomerative hierarchical clustering. The distance between agglomerate clusters is re-computed and each two closest clusters merged until a desired number of speaker clusters is obtained.

In the step in box 28, HMM speaker models are trained for each speaker based on the initial clustering data. Multiple individual speaker models are combined in the step in box 30 by connecting the models in parallel to form a conversational HMM speaker network.

The step in box 32 uses the HMM speaker network to segment the incoming audio stream. Segmentation is performed using Viterbi decoding to find the most likely state sequence through the speaker network, marking those times when the state path changes speaker.

The accuracy of the segmentation and indexing can be improved in postprocessing applications by returning to the step in box 28 to retrain the speaker models, using the segmentation information from the step in box 32. Iterations of retraining and resegmenting may be continued until no significant changes in the segmentation occur in the step in box 32. The resulting index indicating audio segments and speakers are output in the step in box 34.

B. Hidden Markov Models

Hidden Markov modeling is a statistical technique commonly used in speech recognition to model whole words, or sub-word units such as phones. Recognition of an unknown utterance is based on finding the model, or sequence of models, which are most probable given the unknown utterance. HMMs can also be used in speaker identification. A model is created for a speaker's pronunciation, either of specific words or of spontaneous speech. Speaker identification is performed by finding the speaker whose model is most likely given the unknown utterance. If the unknown utterance contains speech from multiple speakers, then speakers are identified by finding the most likely sequence of speaker models.

In the abstract, an HMM consists of a sequence of states, with transitions occurring between states at fixed time intervals. Each time a transition is made into a state, an output characteristic of that state is generated. In both speech recognition and speaker identification, these outputs represent a spectral estimate of the speech for that time interval, for example the cepstrum. The cepstrum is an estimate of the spectral envelope commonly used in speech recognition and speaker identification. It is the inverse Fourier transform of the log spectrum, and serves to deconvolve the spectral envelope and the periodic voicing source.

Transitions between states specify the sequence of outputs. By associating probabilities with the transitions between states, as well as with the outputs of each state, HMMs can be used to statistically model speech. The term hidden is used, because only the outputs of the system are seen—the underlying state sequence can only be inferred.

Figure 3:
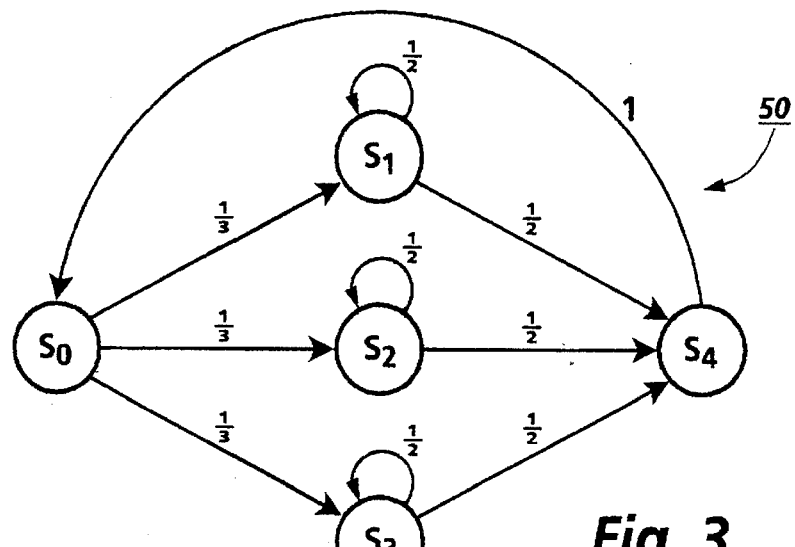
FIG. 3 shows a five state Hidden Markov Model (HMM).

More formally, a HMM L consists of N states $S_0 \ldots S_{N-1}$, the transition probabilities $a_{i,j}$, i=0 ... N−1, j=0 ... N−1, where $a_{i,j}$ is probability of a transition from state i to state j, and the probability distributions $b_i(x)$, i=0 ... N−1, where $b_i(x)$ is the probability, given in state i, of generating the output x. For example, $b_i(x)$ could be a multivariate Gaussian distribution for the feature vector x. In addition, there are null states which can be visited but produce no output. FIG. 3 shows a five state HMM. The transition probabilities from state $S_0$ to states $S_1$, $S_2$ or $S_3$ are uniform, that is, $a_{0,j}=\frac{1}{3}$, j=1,2,3. For states $S_i$, i=1,2,3, there are self transitions and transitions to state $S_4$, each equally likely. Thus $a_{i,i}=\frac{1}{2}$ and $a_{i,4}=\frac{1}{2}$ for i=1,2,3. For state $S_4$, a transition is always made to state $S_0$, thus $a_{4,0}=1$. Associated with states $S_1$, $S_2$, and $S_3$ are output distributions $b_1(x)$, $b_2(x)$ and $b_3(x)$ respectively. States $S_0$ and $S_4$ are null states, and thus have no associated output distributions. Note that an equivalent HMM can be formed by combining states $S_0$ and $S_4$. However, this is not done to simplify the task of combining HMMs into a larger HMM network, as will be described below. A more in depth discussion of HMMs may be found in Rabiner, "A Tutorial on Hidden Markov Models and Selected Applications in Speech Recognition", Proc. IEEE, Vol. 77, No. 2, February, 1989, pp. 257–285.

Figure 4:
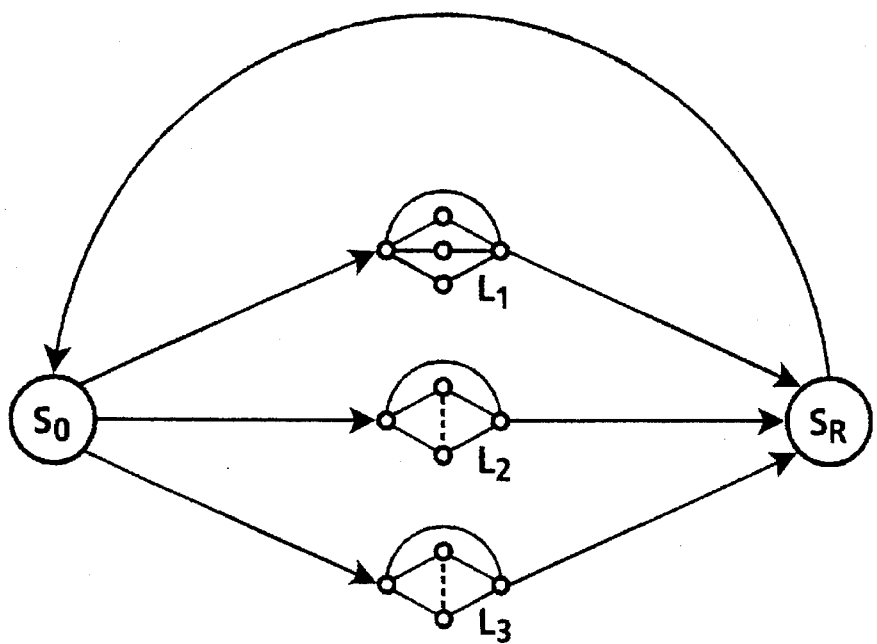
FIG. 4 shows an HMM network of three objects modeled by HMMs.

A network HMM modeling a sequence of objects is created by connecting individual HMMs in parallel, as follows. Let $L_i$, i=1, ... , M be the HMMs for each of the L objects to be recognized. As noted previously, objects can be either words, phones or speakers. The network HMM is created by adding transitions between the object HMMs for all allowable sequences of objects. In FIG. 4, three objects are modeled by HMMs $L_1$, $L_2$ and $L_3$. These objects can occur in any order, as shown by the transitions. State $S_0$ is a null state, and thus produces no output. From $S_0$, it is equally probable to transition to the object HMMs $L_1$, $L_2$ and $L_3$. The exit from all object HMMs is to state $S_R$, which in turn transitions to state $S_0$.

Figure 5:
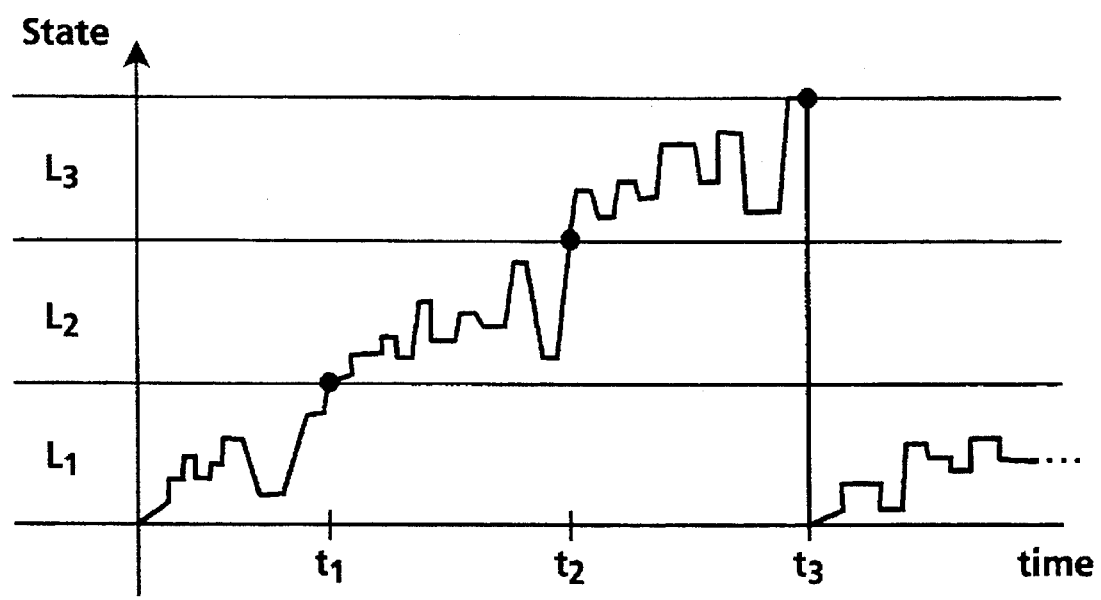
FIG. 5 illustrates the results of the Viterbi algorithm.

Given a sequence of T outputs $X=x_1 \ldots x_T$, recognition is performed by determining which sequence of object HMMs most likely generated the output sequence X. This is done using a Viterbi algorithm to find the sequence of states through the network that most likely generated the output X. Because each state in the sequence is specific to the HMM of one of the objects to be recognized, the most likely state sequence specifies sequence of objects recognized. FIG. 5 illustrates the results of the Viterbi algorithm. The x-axis indicates time, and the y-axis indicates the current state in the network HMM. States corresponding to the HMMs $L_1$, $L_2$ and $L_3$ are indicated by regions on the y-axis. While there are many possible state sequences that could have resulted in the given output, the Viterbi algorithm finds the most probable one. FIG. 5 shows the Viterbi path. At time $t_0$, the most likely object is $L_1$. At time $t_1$, the object is $L_2$, and at $t_2$, the object is $L_3$. At time $t_3$, the most likely object becomes $L_1$.

The parameters for an HMM, then, are the transition probabilities $a_{i,j}$ and the output probabilities $b_i(x)$. These parameters can be learned by training the HMM with outputs X known to have been generated by the object modeled by the HMM. An algorithm know as the Baum-Welch procedure is commonly used. This is an algorithm which iteratively finds values of the parameters that maximize the likelihood of the training data X. The algorithm begins with an initial guess of the parameters. Then, the following steps are performed: (1) computing the probability of transitions between states, and the probabilities of outputs from the states, based on the training data, and (2) using these probabilities to compute estimates of the transition probabilities $a_{i,j}$ and output probabilities $b_i(x)$. Steps (1) and (2) are repeated until convergence. A more thorough description of this algorithm may also be found in Rabiner.

C. Speaker Sub-networks

Figure 6:
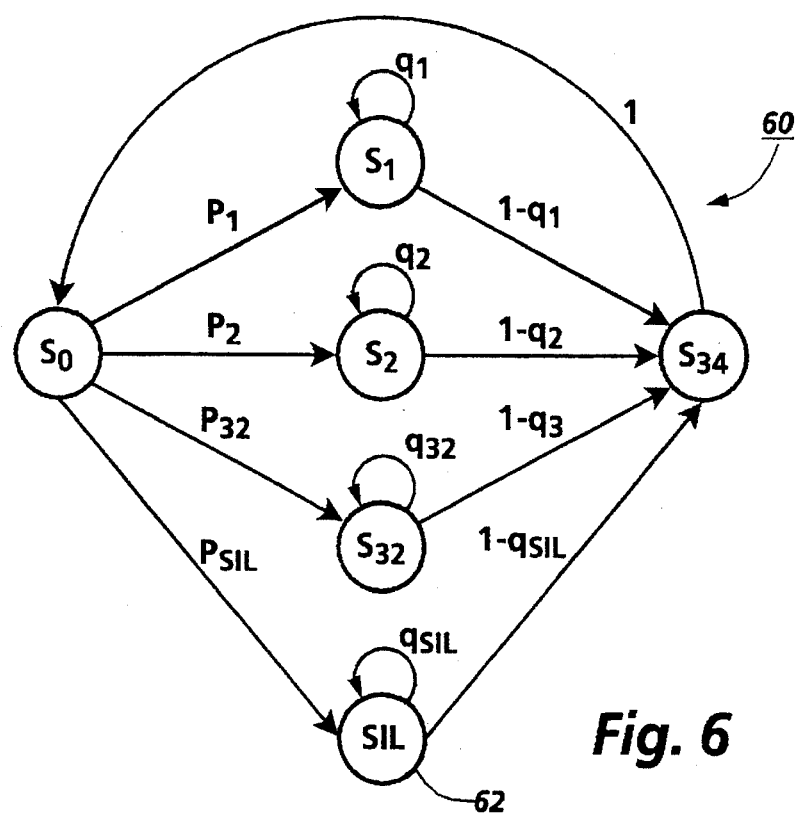
FIG. 6 shows a 35 state HMM modeling the speaking style of an individual.

As mentioned above, Hidden Markov Models can be used to model individual speakers for the purpose of speaker identification. As shown in FIG. 6, the speaking style of an individual (as opposed to a specific utterance) may be modeled using an HMM 60 with 35 states. State $S_0$ is a null state, with transitions to output-producing states $S_1, \ldots, S_{32}$ and $S_{SIL}$. The probabilities of these transitions are given by $p_1, \ldots, p_{32}$ and $p_{SIL}$. Each of these output-producing states has a self-transition, with probability $q_i$, and a transition to the final null state $S_{34}$ with probability $1-q_i$. The null state $S_{34}$ transitions to the initial null state $S_0$ with probability 1. Each non-null state has a Gaussian output distribution, characterized by a mean vector and a diagonal covariance matrix.

Figure 7:
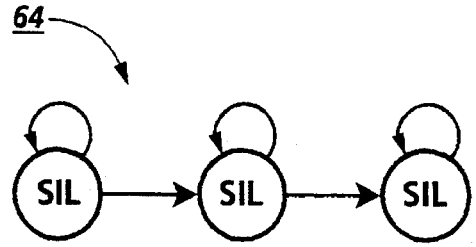
FIG. 7 shows a silence sub-network.

FIG. 7 shows silence sub-network 64. It consists of 3 states, connected serially. Each state has a common or tied Gaussian output distribution, as indicated by the label SIL. This output distribution is also identical to the output distribution in silence state 62 in speaker model 60, as indicated by the state label SIL. The silence sub-network models long periods of silence, but is not appropriate for pauses, or brief silence intervals in conversational speech. These are modeled by the silence state 62 in the individual speaker model. The output distributions in the silence states of the speaker HMMs are all tied to the output distributions in the silence sub-network.

Each speaker HMM must be trained to the speaking style of a given speaker. This is done by using the Baum-Welch algorithm described in the previous section to estimate the transition probabilities $a_{i,j}$ and the means and diagonal covariances for the Gaussian output probabilities $b_i(x)$. Initial estimates of the HMM parameters are obtained as follows. All transition probabilities are set uniformly, so that all transitions from a given state are equally likely. In order to initialize the Gaussian output distributions, a grand mean and diagonal covariance matrix is computed from the training data for the speaker. The covariance matrix for the Gaussian output distributions for all states is set to the grand covariance matrix. The means are set by adding a small constant to the grand mean, where the constant is added to a random component for each different state. The Baum-Welch iteration is then performed using the speaker's training data.

When the speakers to be recognized are known beforehand, training data for the Baum-Welch algorithm is obtained by using 30 seconds to 1 minute of speech data for each speaker. The speech should represent the usual speaking style of the speaker—the actual words used are unimportant.

In addition to the speaker and silence sub-networks, a garbage sub-network is often used to model any speaker not specified by one of the speaker models, or possible non-speech sounds. The form of the garbage network is the same as that of a speaker network, as shown in FIG. 6. However, depending on the application, the garbage network is trained using different data. For instance, if the garbage sub-network is used to model non-speech sounds, it should be trained as a speaker model, but using the non-speech data. If it is to model speakers not known to the system, one way to obtain training data is to use portions of speech from each of the known speakers.

It is important to note that not all the data from all the speakers is used when training the garbage model. Using all the available data would give much more training data to the garbage model than to each speaker model, and has the effect of creating a more robust speaker model for all of the speakers. The resulting HMM network then classifies most speech as garbage.

In one implementation, input audio training data is sampled at 8 KHz, and feature vectors computed every 10 ms. For example, a feature vector for each frame may be computed by performing 20th order Linear Predictive Coding (LPC) analysis of the samples under a 25 ms window, and then computing 20 cepstral coefficients from the LPC spectrum.

In some cases, the speakers to be recognized are not known beforehand. However, it is still necessary to obtain initial estimates for the speaker models. This is done using a hierarchical agglomerative clustering algorithm to create a rough partition of the data to be recognized into different speakers.

D. Hierarchical Agglomerative Clustering

Hierarchical agglomerative clustering can be used to obtain initial estimates of the speaker sub-networks by providing a partition of the data according to speaker. This data can then be used as training data for Baum-Welch training of the speaker HMMs.

Figure 8:
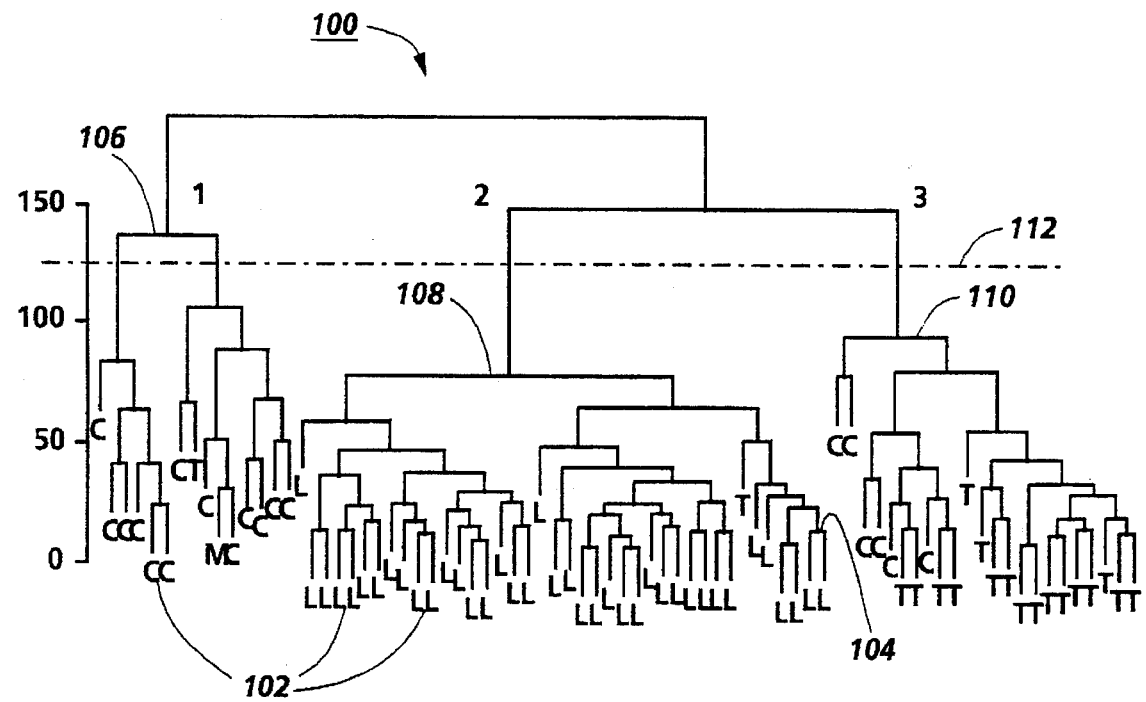
FIG. 8 illustrates hierarchical clustering on a set of intervals that have been labeled by speaker.

The unsegmented data is first divided into equal length segments, each consisting of several seconds of speech. These segments are used as the initial set of clusters for the hierarchical clustering algorithm. The algorithm proceeds by first computing all the pairwise distances between clusters, and then merging the two closest clusters. This process is repeated until the desired number of speaker clusters is obtained. This is illustrated in FIG. 8. In the case where the number of speakers is unknown, the algorithm can be used to estimate the number of speakers. In this case, merging of the closest clusters continues until a stage when the distance between the closest clusters exceeds a fixed threshold. Clustering is stopped here, and the number of clusters is used as an estimate of the number of speakers.

FIG. 8 illustrates hierarchical clustering 100 on a set of intervals that have been labeled by speaker. The original intervals 102 are indicated by the leaves of the tree labeled with "C", "L", or "T", for the three speakers. Pairwise distances between all such intervals are computed, and the closest two intervals are merged, as shown in 104.

This process of merging the closest clusters is repeated, until the desired number of clusters is formed. For three clusters, the branches of the tree corresponding to the clusters are indicated. The first cluster 106 contains mostly intervals from speaker "C", the second cluster 108 contains mostly speaker "L", while the third cluster 110 contains mostly speaker "T".

If the number of speakers is unknown, a threshold on the distance can be set, so that merging of clusters is stopped when the threshold is exceeded. This is illustrated by the line 112, which produces four clusters (cluster 1 is split).

Assume a cluster X consists either of a single segment X=x, or of a set of segments X=$x_1, x_2, \ldots$. The distance between clusters X and Y is denoted by d(X,Y). In previous systems, the distance between segments was derived from a likelihood ratio, based on a Gaussian assumption. Let x=$s_1$, ..., $s_r$ denote data in one segment, y=$s_{r+1}, \ldots, s_n$ denote the data in the other segment, and z=$s_1, \ldots, s_n$ denote the data in the combined segments, and assume the $s_i$ are i.i.d. Let L(x,$\theta_x$) be the likelihood of the x sequence, where $\theta_x$ are estimates for the parameters of the Gaussian distribution. Similarly let L(y,$\theta_y$) be the likelihood for the y sequence and L(z,$\theta_z$) the likelihood for the combined sequence z. Let $\lambda$ X denote the likelihood ratio:

$$\lambda = \frac{L(z, \theta_z)}{L(x, \theta_x) L(y, \theta_y)} \quad (1)$$

Note that equation (1) expresses the likelihood ratio $\lambda$ as a quantity independent of the order of data within segments x and y.

The distance measure used in clustering is $-\log(\lambda)$.

Since speech data is not well modeled by a single Gaussian, the likelihood ratio is extended to tied mixtures of Gaussians. The unsegmented data is first used to estimate the means and covariance matrices for a mixture of M Gaussians. These are then fixed for the rest of the analysis. Let $N_i(s) = N(s:M_i,\sigma_i)$ be the Gaussian distribution associated with the $i^{th}$ mixture component, and let $g_i(x)$ be the weight for the $i^{th}$ mixture estimated using the data sequence x. $g_i(x)$ is estimated as the proportion of samples in x for which $N_i(s)$ is maximum. Then the likelihood of the x sequence is $$L(x, \theta_x) = \prod_{j=1}^{r} \sum_{i=1}^{M} g_i(x) N_i(s_j) \quad (2)$$

where here $\theta_x = (g_1(x), \ldots, g_M(x))$. The likelihood L(y,$\theta_y$) is computed similarly. In computing the likelihood for the combined sequence L(z,$\theta_z$), we obtain the mixture weights $g_i(z)$ as $$g_i(z) = (r/n)g_i(x) + ((n-r)/n)g_i(y) \quad (3)$$

The distance measure for clustering, $d_L = -\log(\lambda_L)$, can then be computed using equation (1).

The clustering procedure of the present invention differs from the usual hierarchical clustering in that the distance between agglomerate clusters is recomputed using equation (1) rather than using the maximum, minimum, or average of the pairwise distance between intervals comprising the clusters. Thus the efficiency of computation of likelihoods provided by equations (2) and (3) is important, since distances are recomputed at each level of clustering.

Additionally, the a priori probability of a speaker change may be computed using a Markov duration model with M speakers. Let $S_i$ denote the speaker during segment i, and M the number of speakers. Assume that $S_i$ is a Markov chain with Pr[$S_{i+1}=a|S_i=a$]=p for each speaker a, and Pr[$S_{i+1}=b|S_i=a$]=(1-p)/(M-1) for each a and b≠a. The probability Pr[$S_{i+n}=S_i$], that the speaker for segment i is also speaking for segment i+n, may be computed by using a two state Markov chain, where state 1 of the chain represents the speaker at time i, and state 2 represents all other speakers. The transition probability matrix P for this chain is $$P = \begin{pmatrix} p & 1-p \\ \frac{(1-p)}{M-1} & 1 - \frac{(1-p)}{M-1} \end{pmatrix} \quad (4)$$

In terms of this matrix, Pr[$S_{i+n}=S_i$]=$(P^n)_{11}$. By diagonalizing P this may be expressed in closed form as $$f(n) \equiv Pr[S_{i+n} = S_i] = \frac{1 + (M-1)\left(\frac{Mp-1}{M-1}\right)^n}{M} \quad (5)$$

Using this equation we can compute the prior probabilities that two given clusters are produced by either the same speaker or by two different speakers. Let C be the number of intervals where speaker changes occur, and let $n_i$ be the length of the $i^{th}$ interval. A duration bias is then defined as $$\lambda_D = \frac{\Pi_i^C f(n_i)}{(M-1)\Pi_i^C (1 - f(n_i))/(M-1)} \quad (6)$$

The duration biased distance is defined as $d_D(X,Y) = -\log(\lambda_L) - \log(\lambda_D)$.

E. Speaker Segmentation Network

Figure 9:
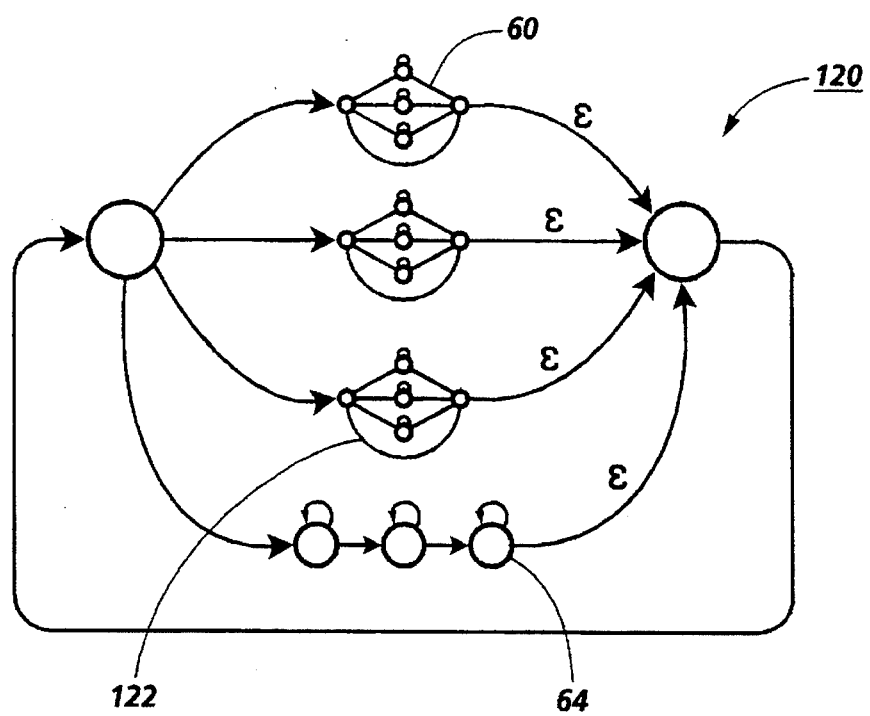
FIG. 9 shows a speaker segmentation network composed of a sub-network for each speaker, and optional sub-networks for silence and garbage.

The speaker segmentation network 120, shown in FIG. 9, is composed of a sub-network 60 for each speaker, and optional sub-networks for silence 64 and garbage 122. Garbage is defined as speech or sound not modeled by the speaker or silence models, such as an unknown speaker or non-speech sounds in the audio. Speaker, garbage, and silence sub-networks are obtained as described above. The network models conversations by two or more speakers, with possible background noise.

Individual speaker sub-networks such as network 60, are connected to each other in parallel, and transition probabilities out of each sub-network are fixed to a small "penalty" constant $\epsilon$ to discourage speaker change based on isolated samples. Each speaker sub-network 60 consists of an HMM with L states, connected in parallel. Each state has a Gaussian output distribution, a self transition and an exiting transition.

Transition probabilities from the initial null state to the speaker, garbage and silence sub-networks are uniform. The transition probability penalty out of speaker, garbage and silence models is set to a constant $\epsilon$. In principle, these transition probabilities could depend on the speaker, and could be learned during training. However, for simplicity, the prior probability of a speaker is assumed to be uniform, and the speaker exiting probability $\epsilon$ is selected empirically to discourage speaker change based on isolated samples.

In practice, this transition probability is extremely small (on the order of $10^{-20}$). Thus the transitions out of each speaker model serve to penalize switching from speaker to speaker.

F. Segmentation of Audio Stream

Indexing a conversation between speakers is simply a matter of finding the most likely state sequence through the network model, given a sequence of observed feature vectors. After the speaker sub-networks have been initialized, speaker segmentation is performed by finding the most likely state sequence through the speaker segmentation network, and marking those times when the state path changes speaker. Speaker changes occur when the optimal state switches from one speaker model to another. Finding the optimal state sequence is accomplished by using the Viterbi algorithm. The accuracy of the segmentation can be improved by retraining the speaker sub-networks using the segmented data. This process of segmenting and retraining is repeated until there is no further change in segmentation.

For increased accuracy, segmentation of speech is performed iteratively, with speaker models being retrained after each segmentation. This increases the accuracy of the segmentation, particularly when speaker training data is not available.

Figure 10:
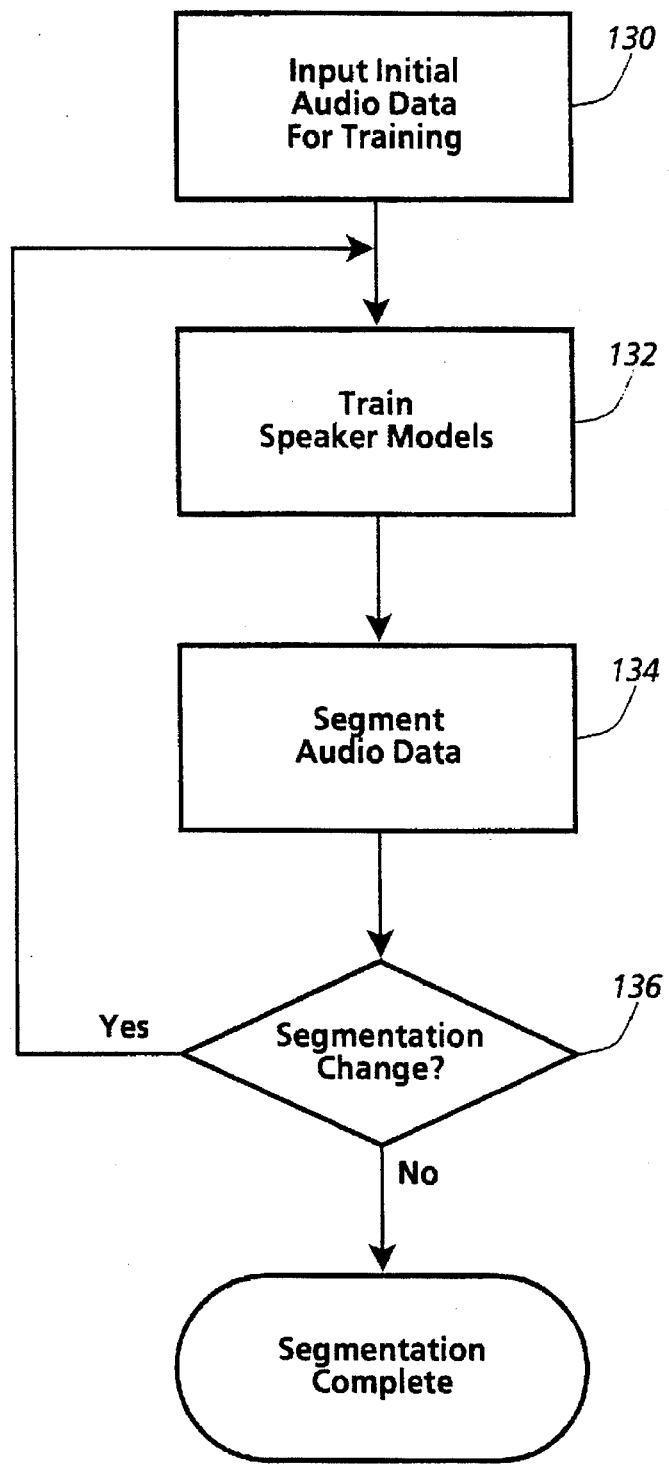
FIG. 10 illustrates an iterative resegmentation algorithm.

The iterative resegmentation algorithm is shown in FIG. 10. Initially, a set of training data is provided in the step in box 130 to train the speaker models in the step in box 132. This data can either be training data from known speakers, or data partitioned using the hierarchical clustering. Segmentation is then performed in the step in box 134 based on these speaker models. If the segmentation in the step in box 134 changes significantly, this improved segmentation is used as new training data for the speakers, and the speaker models are retrained in the step in box 132. This process continues until the segmentation remains unchanged in the step in box 136.

G. Application

Figure 11:
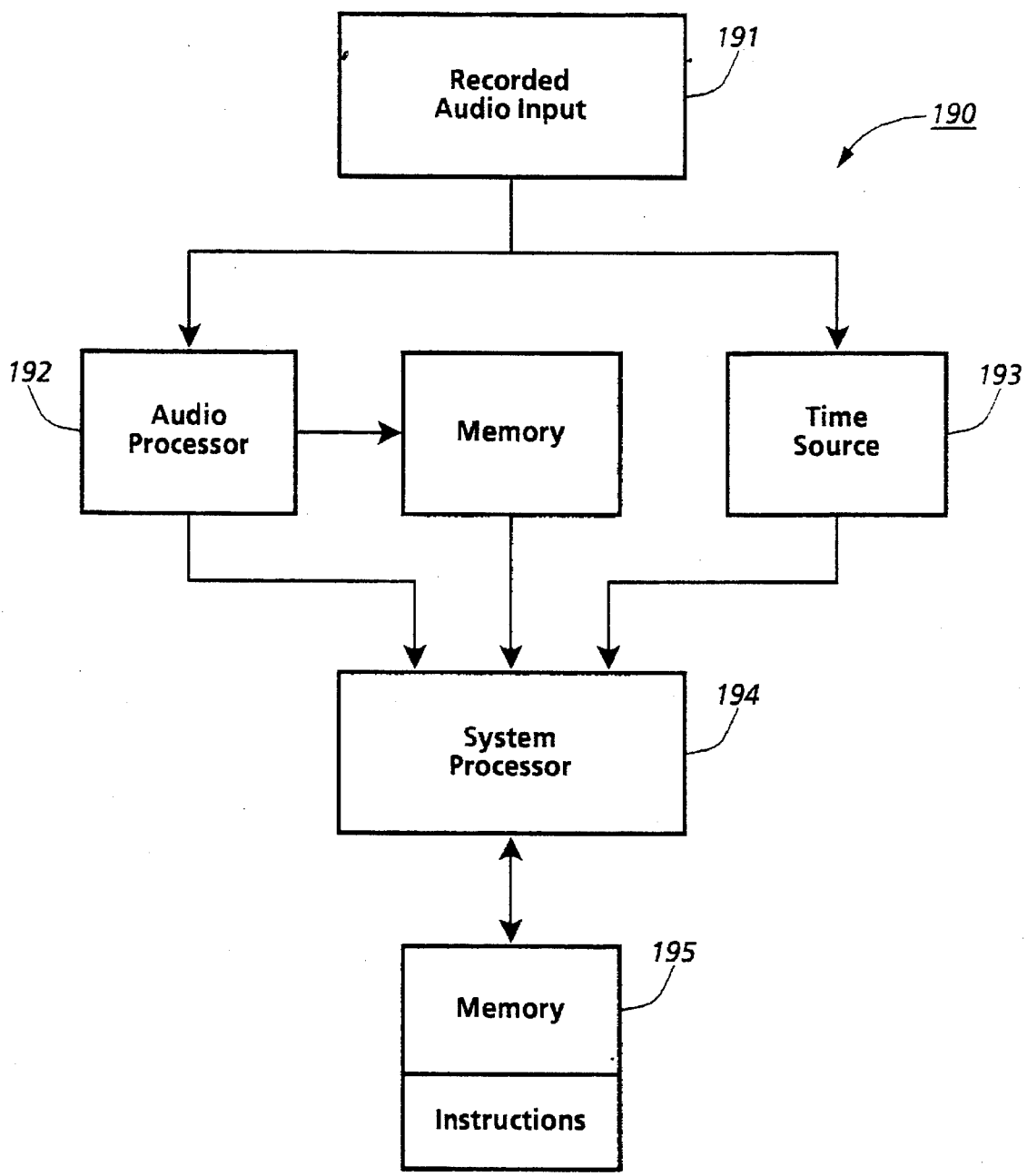
FIG. 11 shows an embodiment of the present invention in a system for creating and storing an index according to speaker of recorded audio data.

FIG. 11 shows an embodiment of the present invention in system 190, for creating and storing an index according to speaker of recorded audio data. Recorded audio input 191 is processed by audio processor 192 into spectral feature data and provided to system processor 194. The spectral feature data may be stored in a memory 197 for use in later iterations by system processor 194.

The spectral data provided by audio processor 192 to system processor 194 is initially segmented and clustered in order to provide data to train initial speaker models and create a speaker network. Spectral data is again processed by system processor 194. Spectral data is processed by system processor 194 by using the speaker network created by system processor 194. As each new segment is detected in the audio stream, system processor 194 obtains a timestamp from time source 193, which indicates the recording address, or storage time, of that audio data from the recording of audio input 191. Time source 193 may be, for example, a clock which is started when the recording is started, or may be a device for recording a time from the recording device connected to the storage medium. This timestamp, along with an identifier of the creator of the segment, is stored in memory 195 for later collection into an index according to speaker.

Figure 12:
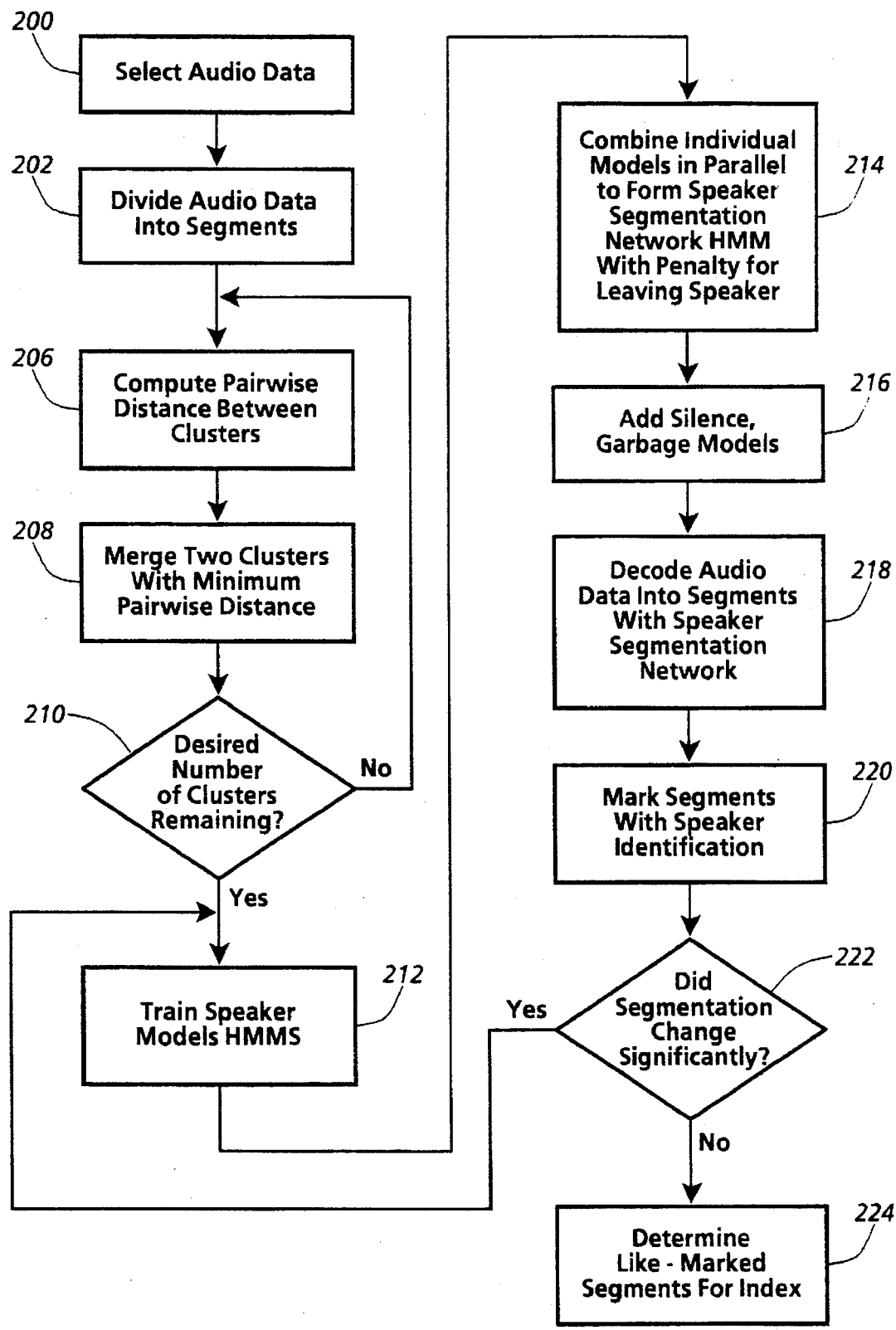
FIG. 12 describes the application of the techniques described above to determine an index of an audio stream when the speakers are not known.

FIG. 12 describes the application of the techniques described above to determining an index of an audio stream when the speakers are not known ahead of time. The step in box 200 selects the audio data to be processed. As discussed previously, the audio used in this step may include a portion containing speech from at least all the speakers in the audio stream to be processed, but will be discussed in terms of the entire audio stream. In the step in box 202, the audio stream is segregated into segments, usually of an equal, small length. These initial segments are used in the following steps as an initial cluster.

The step in box 206 computes the pairwise distance between each cluster, and the step in box 208 merges the two clusters with the minimum pairwise distance. If there are more clusters than desired in the step on box 210, the distances between the new clusters is computed in the step in box 206, and again the two closest are combined in the step in box 210, until the desired number of clusters remains. The desired number of clusters may be based upon a total distance limit between the clusters, or may be a set number. For example, the total number of speakers in an audio segment may be known, even if training data is not available. The system may be set to merge until that number of initial clusters is determined.

Once the initial clustering is completed, the step in box 212 trains the individual speaker model HMMs. These individual models are combined in parallel in the step in box 214, with a penalty added for leaving the speaker. If silence and garbage models have not already been generated in the step in box 212 and added to the network, they may be added in the step in box 216. In the step in box 218, the audio stream is segregated into segments, using the speaker segmentation network. The segments are marked with identification of the speaker for each segment in the step in box 220.

The step in box 222 checks to see if the segmentation changes significantly in the previous iteration. If it did, then the models are retrained in the step in box 212, and another iteration of the segmentation is performed with the improved models. When no significant changes occur as a result of the retraining, the iterations are completed, and an index for the recording is created by collecting segments that are similarly marked by individual.

H. Miscellaneous

Although the method for clustering audio data segments according to speaker has herein been described in relation to various implementations for input into a speaker network for speaker indexing of audio data, together with modifications, variations and extensions thereof, other applications, implementations, modifications, variations and extensions are within the scope of the invention. The invention is therefore not limited by the description contained herein or by the drawings, but only by the claims.

What is claimed:

1. A method for unsupervised clustering of audio data segments in an audio data recording containing speech from multiple speakers to segment the audio data recording by speaker, the method comprising the steps of:
   a) providing a portion of said audio data containing speech from at least all the speakers in said audio data;
   b) forming initial clusters by dividing said portion of said audio data into segments, each segment including a set of data having an order;
   c) computing a pairwise distance between each pair of clusters using a likelihood ratio independent of data order within the segments;
   d) combining two clusters with a minimum pairwise distance into a new cluster; and
   e) repeating said steps b), c), and d) until a number of clusters equal to a number of the multiple speakers is obtained.

2. The method of claim 1, wherein said step of dividing said audio portion into clusters comprises dividing said audio data into segments of equal size.

3. The method of claim 2, wherein said step of computing a pairwise distance between each pair of clusters comprises computing a likelihood ratio that segments were generated by the same speaker, said likelihood ratio being based on tied mixtures of Gaussians.

4. The method of claim 3, wherein weights for said tied mixtures of Gaussians comprise a weighted average of mixture weights of clusters.

5. The method of claim 3, wherein said step of computing a pairwise distance between each pair of clusters further comprises, for each repetition, recomputing the pairwise distance using the likelihood ratio based on tied mixtures of Gaussians.

6. A method for segmenting audio data by speaker in an audio recording representing multiple speakers, the method comprising the steps of:
  a) providing an audio portion of said audio recording containing speech from at least all the speakers in the audio recording;
  b) forming initial clusters by dividing said audio portion into segments, each segment including a set of data having an order;
  c) until a number of clusters is obtained that is equal to a number of the multiple speakers:
    1) computing a pairwise distance between each pair of clusters using a likelihood ratio independent of the order of the data within the segments;
    2) combining two clusters with a minimum pairwise distance;
  d) for each of said desired number of clusters, training an individual Hidden Markov Model (HMM);
  e) combining said individual HMMs in parallel to form a speaker network HMM;
  f) determining an optimal path through said speaker network HMM for said audio data, identifying segments of said audio data associated with each individual HMM; and
  g) marking each segment according to the individual HMM from which it was created.

7. The method of claim 6, further comprising:
  iteratively performing the steps of:
    collecting segments marked by each individual HMM;
    retraining each of said individual HMMs with said collected segments marked by said individual HMM;
    combining retrained individual HMMs in parallel to form a speaker network HMM;
    for said audio data, determining an optimal path through said speaker network HMM, identifying segments of said audio data associated with each of said individual HMMs; and
    marking each segment according to the individual HMM from which it was created;
  said iterations continuing until boundaries of identified segments are not significantly different from segments of the previous iteration.

8. A processor controlled system for estimating speaker segmentation in recorded audio data, the system comprising:
  a) an audio source for providing recorded audio data comprising speech from a plurality of individual speakers, wherein a total number of individual speakers in said audio data is not known;
  b) an audio processor for receiving said audio data and converting said audio data into spectral feature data;
  c) memory for storing data, the data stored in the memory including instruction data indicating instructions;
  d) a system processor coupled to the memory for accessing the data stored in the memory executing the instructions, and receiving said spectral feature data from said audio processor and producing estimated speaker models by:
    1) dividing said spectral feature data into segments to form initial clusters of equal arbitrary length, each segment having a set of spectral feature data having an order;
    2) combining said initial clusters into speaker clusters based on a likelihood ratio that segments were generated by the same speaker, said likelihood ratio being independent of the order of the spectral feature data within the segments and being based on tied mixtures of Gaussians;
    3) producing estimated speaker models based on said speaker clusters, each speaker model having an associated identifier;
  said system processor further combining said estimated speaker models into a speaker network;
  said system processor, using said speaker network, determining segments of said audio data which correspond to different individual speaker models, a number of the segments equaling the total number of individual speakers;
  said system processor further determining at the start of each segment a timestamp, said timestamp corresponding to the received time for that segment on said storage medium, said system processor storing said timestamp in said memory; and
  said system processor further storing said speaker identifier of said individual speaker model for each segment in said memory in conjunction with said storage medium location address for that segment.

9. The system of claim 8, wherein said system processor, in producing estimated speaker models, further
  a) computes a pairwise distance between each pair of clusters;
  b) combines two clusters with a minimum pairwise distance into a new cluster; and
  c) repeats said steps a), b) until the minimum pairwise distance between each of said clusters is greater than a maximum distance, said maximum distance stored in said memory instructions.

10. The system of claim 9, wherein said system processor, in producing estimated speaker models, further provides for each of said clusters an individual HMM speaker model.

11. The system of claim 10, wherein said system processor, in combining said estimated speaker models into a speaker network, further combines said individual HMM speaker models in parallel to construct a speaker network HMM.

12. The system of claim 11, wherein said system processor, in determining segments of said audio data which correspond to different speaker models, determines an optimal path through the speaker network HMM, identifying segments of said audio data associated with different individual HMM speaker models.

13. The system of claim 8, wherein said system processor further collects a set of segments associated with each speaker identifier.

14. The system of claim 13, wherein said system processor further uses collected segments associated with each speaker identifier to produce new speaker models for each of the plurality of individual speakers, said system processor further combining said new speaker models into a new speaker network;
  said system processor further receiving said spectral feature data and, using said new speaker network, determining segments of said audio data which corresponds to different new individual speaker models; said system processor further determining at the start of each segment a timestamp, said timestamp corresponding to the received time for that segment on said storage medium, said system processor storing said timestamp in said memory; said system processor further storing said speaker identifier of said new individual speaker model for each segment in said memory in conjunction with said timestamp for that segment.

* * * * *